Jan. 2, 1934.   G. E. CLEVELAND   1,941,598
MACHINE FOR TURNING AND GRINDING
Filed Nov. 6, 1931   7 Sheets-Sheet 1

INVENTOR.
Grover E. Cleveland
BY Geo. B Pitts
ATTORNEY.

Jan. 2, 1934.  G. E. CLEVELAND  1,941,598
MACHINE FOR TURNING AND GRINDING
Filed Nov. 6, 1931  7 Sheets-Sheet 2
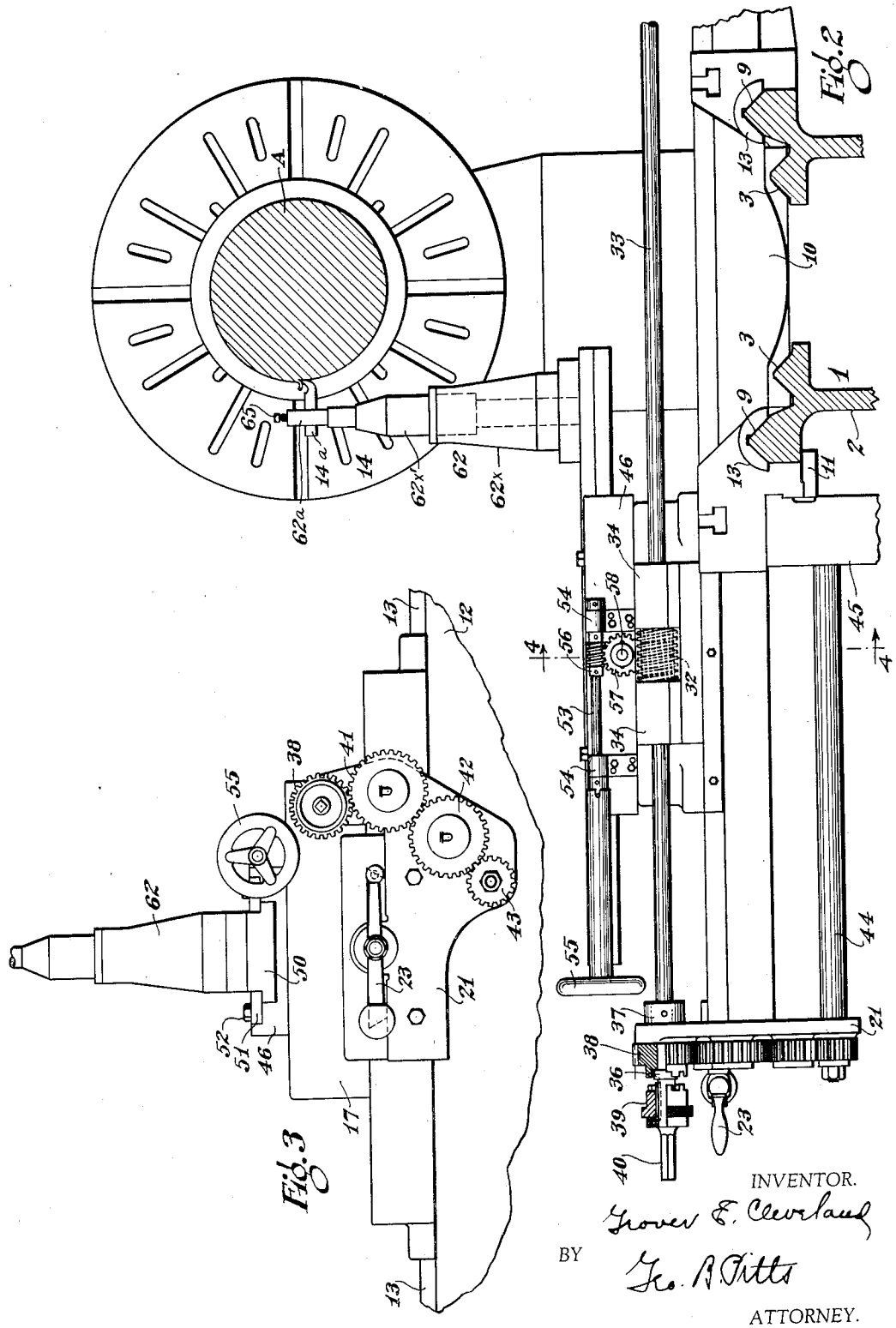
INVENTOR.
Grover E. Cleveland
BY
Geo. B. Pitts
ATTORNEY.

Jan. 2, 1934.   G. E. CLEVELAND   1,941,598
MACHINE FOR TURNING AND GRINDING
Filed Nov. 6, 1931   7 Sheets-Sheet 3
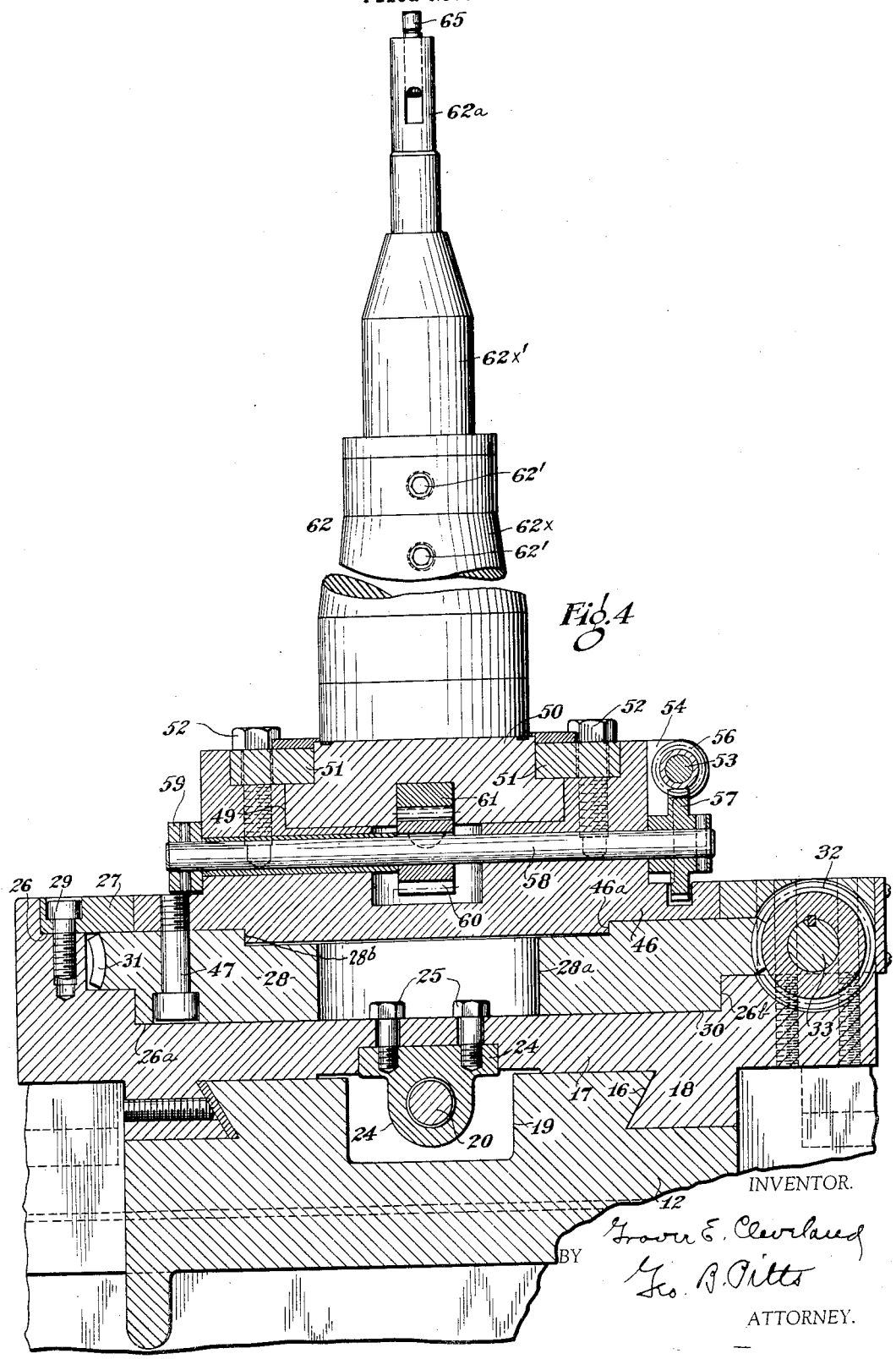

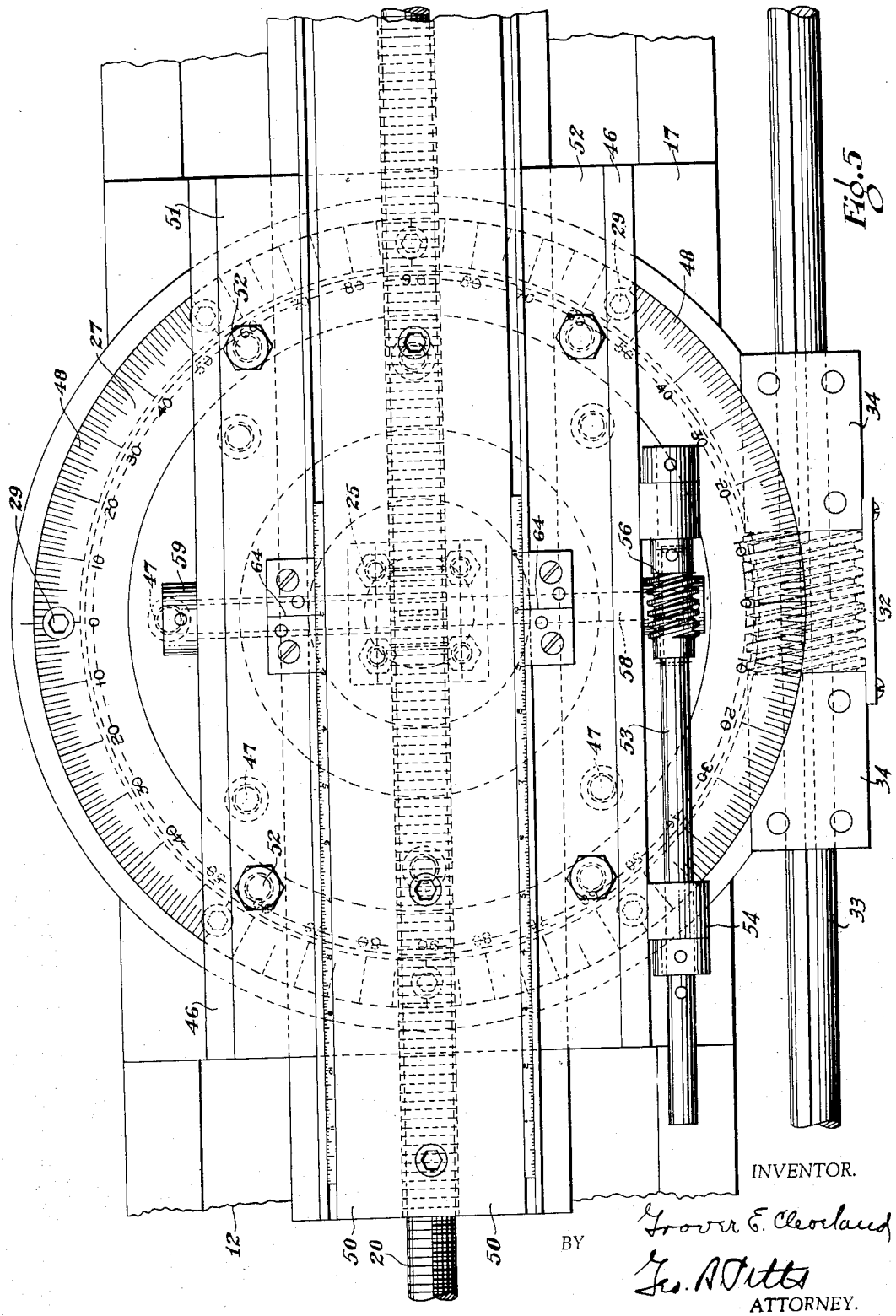

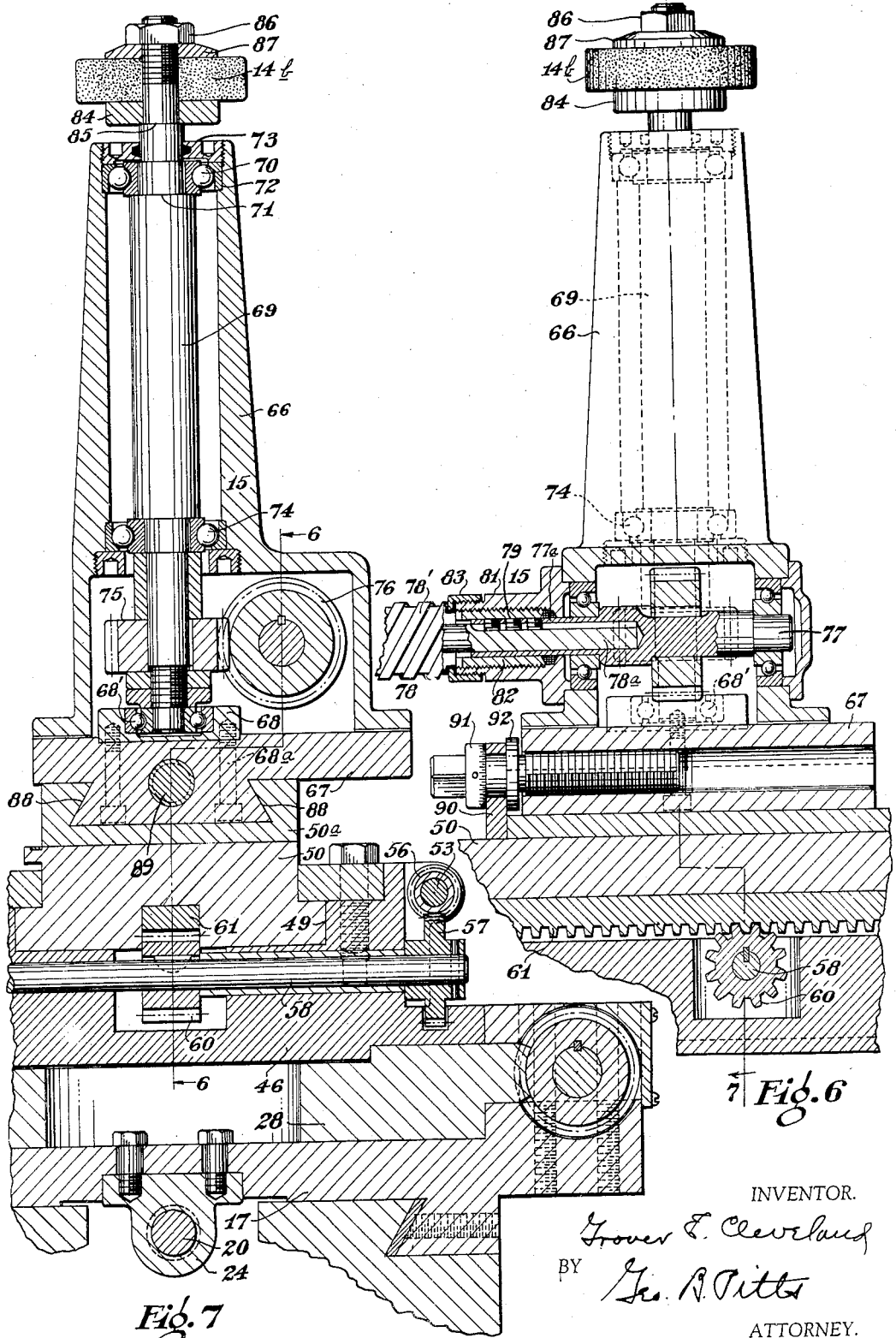

Jan. 2, 1934.  G. E. CLEVELAND  1,941,598
MACHINE FOR TURNING AND GRINDING
Filed Nov. 6, 1931  7 Sheets-Sheet 6
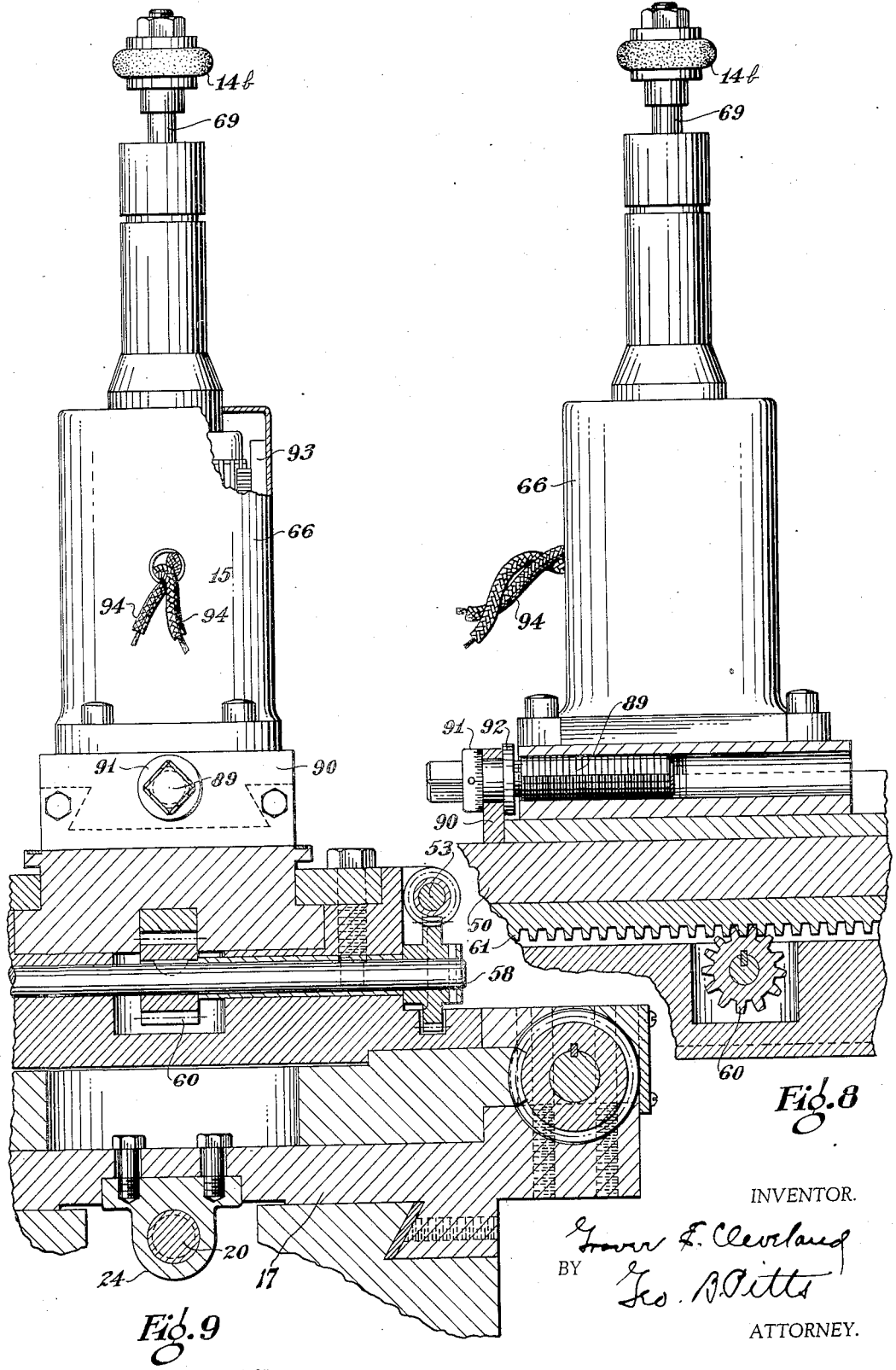
INVENTOR.
BY
ATTORNEY.

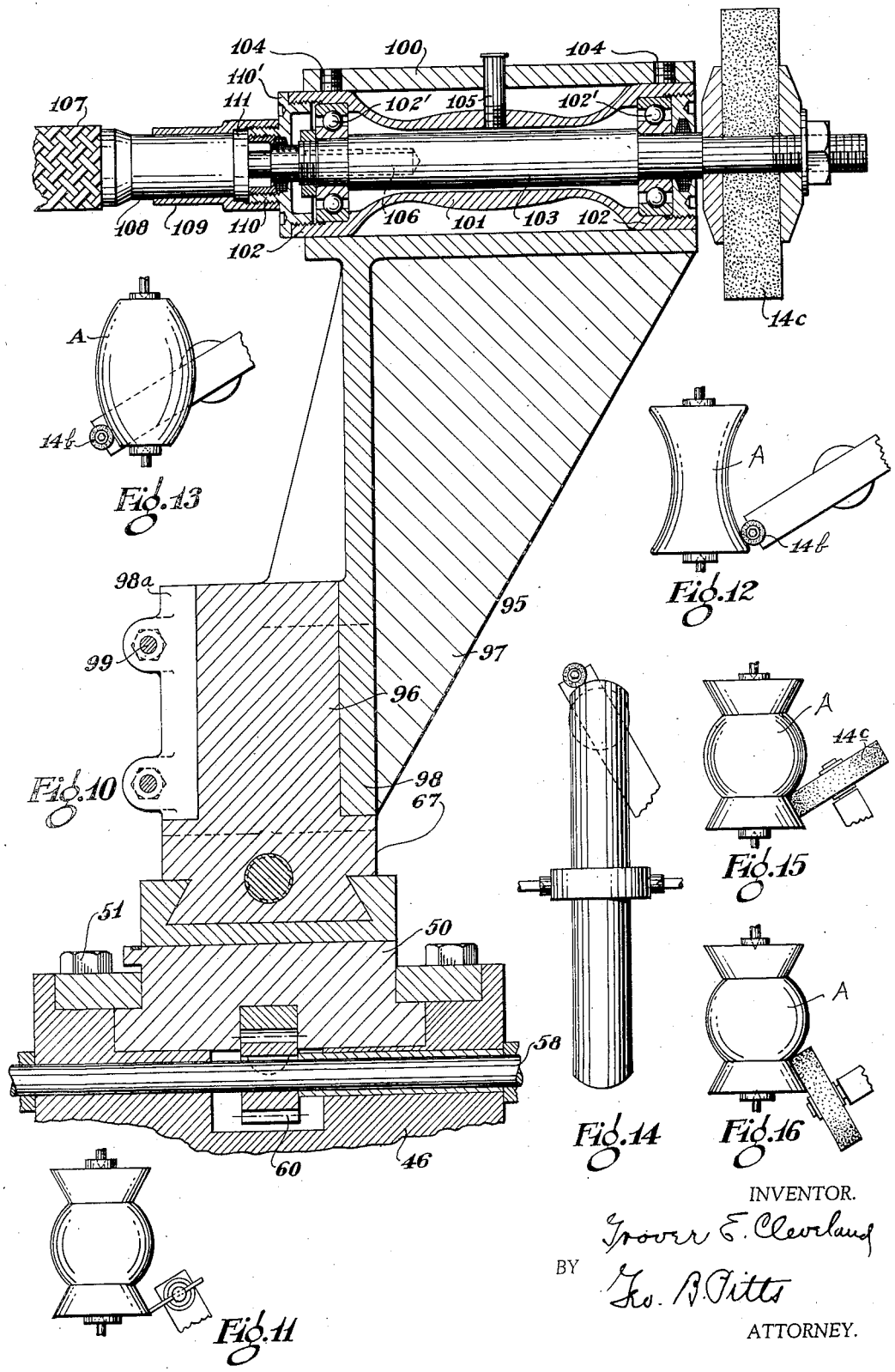

Patented Jan. 2, 1934

1,941,598

UNITED STATES PATENT OFFICE 1,941,598

MACHINE FOR TURNING AND GRINDING

Grover E. Cleveland, Cleveland, Ohio, assignor to The Yoder Company, Cleveland, Ohio, a corporation of Ohio Application November 6, 1931. Serial No. 573,343

6 Claims. (Cl. 51—33)

This invention relates to a machine for turning or grinding a surface which is curved or disposed in a plane parallel or at an angle to the axis on which the work-piece is rotating, and also a surface composed of a curved portion and a plane portion.

One object of the invention is to provide a machine of this character wherein a convexed or concaved surface may be readily turned or ground.

Another object of the invention is to provide a machine capable of readily turning or grinding a surface having a curved portion and a plane portion.

Another object of the invention is to provide a machine of this type in which the wear on the grinding tool may be readily compensated for.

Other objects of the invention will be apparent to those skilled in the art to which my invention relates from the following description, taken in connection with the accompanying drawings herein.

Fig. 2 is a fragmentary section partly on the line 2—2 and partly on the line 2a—2a of Fig. 1.

Fig. 3 is an end view of parts shown in Figs. 1 and 2.

Fig. 4 is a section on the line 4—4 of Figs. 1 and 2.

Fig. 5 is a fragmentary plan view of parts shown in Figs. 1 and 2.

Fig. 6 is a fragmentary view, partly in side elevation with parts broken away and partly in section on the line 6—6 of Fig. 7, and showing the mounting of a grinding tool.

Fig. 7 is a section on the line 7—7 of Fig. 6.

Figs. 8 and 9 are views substantially similar to Figs. 6 and 7, respectively, but showing a modified construction.

Fig. 10 is a fragmentary view showing the mounting of a tool on a horizontal axis.

Figure 1:
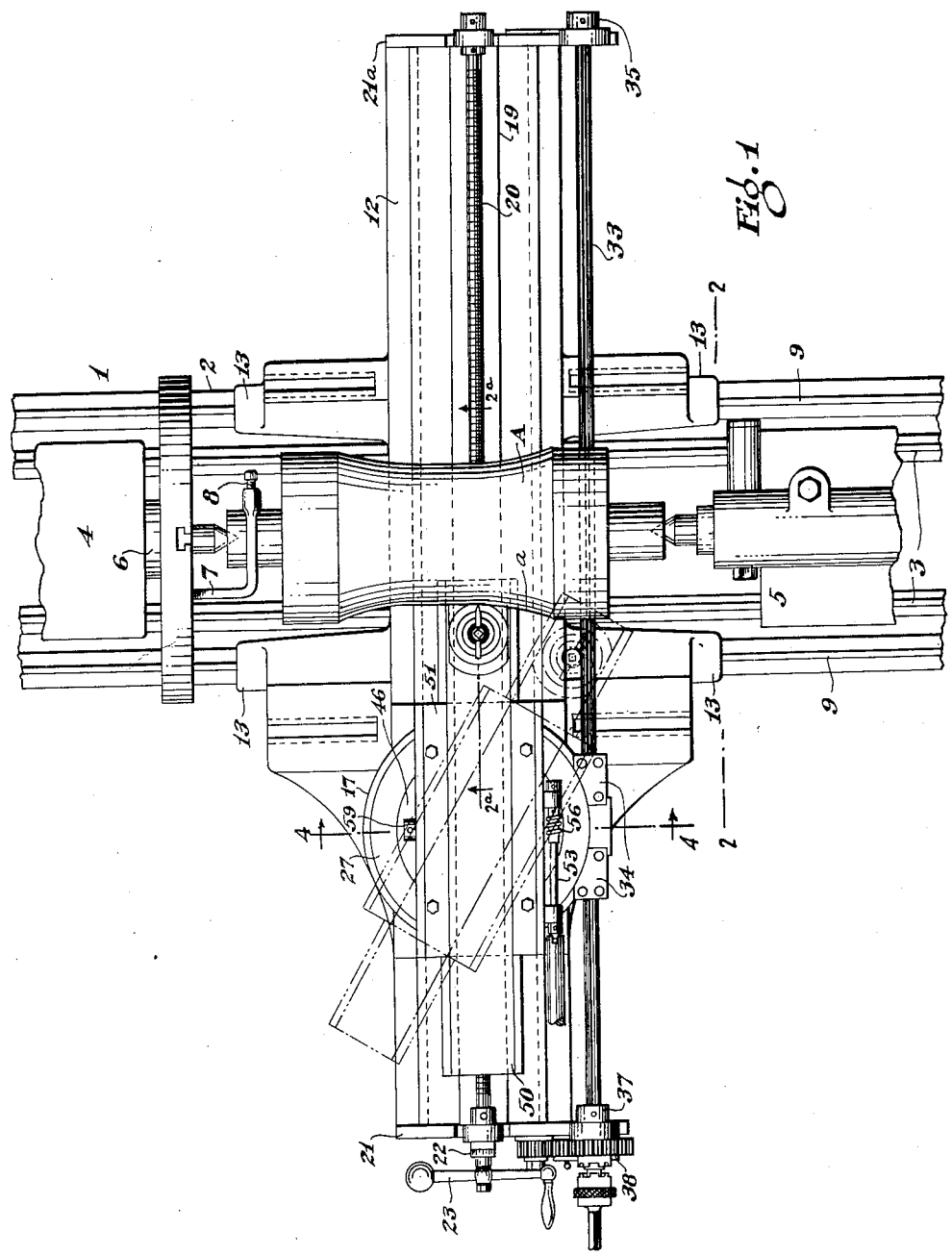
Fig. 1 is a plan view of a portion of a lathe showing the head and tail stocks thereof and a tool supporting and operating mechanism embodying my invention.

Figs. 11 to 16, inclusive, are diagrammatic views showing operation of the tools on different workpieces.

In the drawings, 1 indicates as an entirety a lathe comprising a frame 2 providing ways or guides 3 for a head stock 4 and a tail stock 5, both being adjustable on the ways 3 in any desired manner and providing centers for a work piece A. The driving means for the shaft 6 of the head stock may be of any desired construction to provide the desired turning speeds. The work piece is preferably secured to the shaft 6 by an arm 7 and set screw 8.

9 indicates ways provided on the frame 2 for a support 10. The support 10 is adjusted along the ways 9 by a rack and pinion, the rack being shown at 11 in Fig. 2 and the pinion (not shown) being mounted on the frame 2 and preferably operated manually. The support 10 comprises a frame 12 having intermediate its ends lateral portions shaped to form suitable shoes or slides 13, which engage the ways 9.

14 indicates as an entirety a tool. In the form of construction shown in Figs. 1 to 5, inclusive, the tool element consists of a cutter 14a. In the forms of construction shown in Figs. 6 to 9, inclusive, the tool element consists of a grinding wheel 14b formed of suitable abrasive, which wheel is rotated by means indicated as an entirety at 15.

The frame 12 is provided from end to end with guides 16 for a main slide 17, which is provided with complementary guides 18 engaging the guides 16. The frame 12 is formed centrally with a longitudinal channel 19 to accommodate a feed screw 20. The opposite ends of the screw 20 are rotatable in suitable bearings provided in end plates 21, 21a, collars being fixed to the screw upon opposite side of each end plate to hold the screw against endwise movement. The collar shown at 22 on the outer side of the plate 21 is provided with graduations which move relative to an index mark on the plate 21 to indicate the feed in proportion to the rotation of the feed screw according to its screw pitch. The feed screw 20 is rotated by a handle 23.

24 indicates a nut through which the feed screw 20 extends. The nut 24 is secured, preferably by cap screws 25, to the lower side of the main slide 17 whereby the latter is moved or adjusted longitudinally of the frame 12 when the screw is rotated.

The upper face of the slide 17 is recessed to form an annular ledge 26 for supporting an annulus 27, and a space 26a for a rotatable support 28. The annulus 27 is preferably secured to the ledge on the slide 17 by countersunk cap screws 29 and it extends inwardly over the support 28 (see Fig. 4), its inner side wall being concentric to the axis of the support 28. The support 28 is provided with a shoulder 30 which rotatably fits the side wall 26b of the space 26a. The marginal portion of the support 28 is provided with worm gear teeth 31 in mesh with a worm 32, whereby the support 28 may be rotated in the space 26a. The central portion of the support 28 is cut away, as shown at 28a, to permit access to the screws 25. The teeth 31 may be cut in the side wall of the support 28, as shown.

The worm 32 is splined to a shaft 33, whereby the main slide 17 may be adjusted while maintaining driving connection between the shaft 33 and the support 28. The worm 32 is maintained in driving relation with the teeth 31 by a pair of blocks 34 suitably secured to the slide 17 upon opposite sides of the worm 32 and through which the shaft 33 extends.

The shaft 33 is mounted in suitable bearings in the end plates 21, 21a and held against endwise movement by a collar 35 fixed to the shaft and engaging the plate 21a and collars 36, 37, fixed to the shaft and engaging the opposite sides of the plate 21. As shown in Fig. 2, the collar 36 acts through the hub of a gear 38 to prevent rearward movement of the shaft 33. The gear 38 is free to rotate on the shaft 33, but is provided with clutch elements, with which a clutch member 39, splined to the outer end portion of the shaft 33, engages and disengages; when the parts are in engagement, the shaft 33 may be driven by the gear 38. When the clutch member 39 is slid outwardly it is disengaged from the clutch elements of the gear 38, and a suitable tool may be applied to the shaft end 40 (see Fig. 2) and the shaft 33 rotated thereby to adjust the support 28 to any angular position as may be necessary for setting the tool 14. The gear 38 is driven through gears 41, 42, by a gear 43 fixed to a shaft 44. The gears 41, 42, are suitably mounted on stud shafts carried by the end plate 21. The shaft 44 is mounted at its outer end in the plate 21 and at its inner end in bearings in a gear case 45. The shaft 44 is connected at its inner end within the case 45 with driven elements which are in turn preferably driven by the motive power utilized to drive the shaft 6.

46 indicates a base member mounted on and secured to the rotatable support 28. By preference, the upper surface of the support 28 is centrally recessed at 28b and the base member 46 has a central thickened portion 46a fitting into said recess. The support 28 and base member 46 are rigidly secured together by a plurality of cap screws 47. The marginal portion of the base member 46 closely fits against and rotates relative to the side wall of the annulus 27. As shown in Fig. 5, the marginal portion of the base member 46 is provided at diametrical sides with "naughts" and between the "naughts" and extending around either side of the base member, each ten degrees of the arc or semi-circle is designated. Preferably at and leading from either side of each "naught" these markings consist of "10", "20", "30", "40", "50", "60", "70", 80, with "90" placed at the quarter circle points. These marks are related to degree graduations 48 provided on the upper surface of the annulus, so that when the support 10 is rotated, its angular movement is shown.

The base member 46 is preferably of substantially rectangular shape and provided with an elevated body portion which is cut-away centrally from end to end to form a guide-way 49 for an upper or secondary slide 50. The slide 50 slides on the bottom of the cut-away between the guide ways 49 and is slidably held in the cut-away by strips 51 secured to the base member 46 by cap screws 52 and lapping over the slide 50. By preference, the slide 50 is somewhat longer than the base member 46 to provide for a long range of adjustment of the tool 14, which is mounted on the slide 50 as hereinafter set forth.

The adjustment of the slide 50 on the base member 46 is preferably provided for as follows: 53 indicates a shaft mounted in bearings 54 suitably secured to one side of the base member 46, the shaft being held against endwise movement by collars disposed on the opposite outer sides of the bearings and fixed to the shaft. The outer end of the shaft 53 is connected, preferably detachably to the shank of a handle 55. 56 indicates a worm on the shaft fixed thereto in any desired manner, being preferably formed integrally at one end with a collar or hub which is pinned to the shaft and held at its opposite end against a collar which is also pinned to the shaft. The worm 56 meshes with a worm gear 57 which is fixed to one end of a shaft 58. The shaft 58 has bearing in an opening extending through the body portion of the base member 46 and fixedly carries at its opposite a collar 59, which co-operates with the gear 57 to prevent endwise movement of the shaft 58. Intermediate the ends of the shaft 58 it carries a pinion 60, which meshes with a rack 61 provided on the lower side and extending from end to end of the slide 50, to move the slide endwise when the shaft 58 is rotated. The slide 50 may be moved endwise in its guide-ways 49 in either direction far enough to effect its removal therefrom. This may be of advantage where different tools are to be used from time to time or where conditions make it desirable to use a slide of greater or shorter length. It also permits the tool pedestal 62 to be permanently secured to the slide. It also permits the slide 50 to be inserted in its guide-ways with the tool disposed at either side of the axis of the support 28, so that the tool may operate on convex surfaces and under varying conditions without undue endwise adjustment of the slide 50.

The opposite sides of the slide 50 are provided with graduations 63 related to lines 64, respectively, disposed in a plane cutting the axis of the support 28, to determine and indicate the adjustment of the slide.

The tool pedestals 62 are constructed according to the type of tool and nature of the work to be done thereby. In the form of construction shown in Figs. 1 to 5, inclusive, the pedestal consists of a plurality of interrelated parts 62x, 62x', terminating in a slotted holder 62a. The shank of the tool element 14a fits into the slot of the holder 62a and is secured therein by a clamping screw 65.

The pedestal part 62x' removably and rotatably fits into an opening or recess formed in the part 62x. The part 62x' is fixed in the part 62x by one or more set screws 62'.

*Operation.*—Fig. 1 shows the operation of turning a side portion of a work-piece A on the arc a. In this operation, the tool 14a is adjusted to the desired radius relative to the center of the support 28. The shaft 33 operating through the worm 32 and gear 31 rotates the support 28 to swing the tool 14a through the desired arc. The shaft 33 is manually controlled to stop, reverse and start it, but these operations may be effected automatically in any well known manner. The feed of the tool is also manually controlled by the operation of the shaft 53, such feed being determined in each instance by the graduations above referred to. When a plane surface is to be turned, the tool 14a is mounted at right angles to the longitudinal axis of the slide 50 or at right angles to the guide-ways therefor and then the support 28 is rotated to dispose the slide 50 parallel to the surface to be turned. The feed of the tool is then effected by operating the shaft 53 to move the slide 50 endwise.

Figures 1 and 12 show the tool turning a concave surface;

Figures 13 and 14 show the tool turning a convex surface.

Any portion of the work-piece may be turned, as above set forth, to provide a curved surface or a plane surface or a portion that is curved and a portion that is plane.

In the use of the terms curved and plane surfaces I refer to the relationship between such surfaces and an imaginary plane in which the axis of the work-piece is disposed.

Where the tool consists of a grinding wheel 14b, as shown in Figs. 6 to 9, inclusive, I provide means for rotating the wheel at the desired speed and an auxiliary adjustment for the tool to compensate for wear thereon.

Referring to Figs. 6 and 7, the tool pedestal consists of a hollow casing 66 removably secured to a base plate 67. The plate 67 is secured to the slide 50, mounted in the base member 46. The base member is secured to the rotatable support 28 carried by the slide 17. The base plate is provided with a seat member 68 for an anti-friction load bearing 68' for the lower end of a shaft 69. The seat member 68 is secured to the base plate 67 by cap screws 68a. The upper end portion of the shaft 69 is supported by combined load and thrust anti-friction bearings 70, the inner race of the bearing being seated against a shoulder 71 on the shaft and the outer race being seated in an annular recess 72 formed in the casing 66 and held therein by a collar 73 threaded into the free end of the casing. 74 indicates a combined load and thrust anti-friction bearing disposed intermediate the ends of the shaft 69, the races of this bearing being mounted similar to the races for the bearings 70. It will be noted that outer races for the bearings 70, 74, are reversed so that they take endwise thrusts in either direction. 75 indicates a worm gear keyed to the shaft 69 between the bearings 68', 74, and meshing with a worm 76 fixed to a shaft 77. The shaft 77 is mounted in anti-friction bearings seated in the end walls of the casing 66 and extends at one end therethrough outwardly for detachable connection to a flexible shaft 78. The outer end 77a of the shaft 77 is hollowed out to receive the free end 78a of the shaft 78, the shaft end 77a carrying keys 79 fitting a key way 80 formed in the shaft end 78a. The casing 78¹ for the shaft 78 and casing 66 are preferably detachably connected to maintain the shafts 77, 78, together by the following devices; 81 indicates a tubular member having a flange suitably bolted to the walls of the casing 66 in concentric relation to the shaft 77. The tubular member 81 is internally threaded to receive a sleeve 82 the inner wall of which forms a bearing for the shaft end 77a. The outer external portion of the tubular member 81 is threaded to take a coupling 83 which has an inturned flange rotatably fitting a grooved collar held in place by the casing 78' of the flexible shaft 78.

The grinding wheel 14b preferably seats against a collar 84 which rests on a shoulder 85 provided near the upper end of the shaft 69. The grinding wheel 14b is secured to the collar 84 by a nut 86 threaded on the free end of the shaft 69 and engaging a collar or washer 87 on the upper side of the wheel.

The base plate 67 is adjustably mounted on the slide 50, so that the grinding tool 14b may be moved independently of the slide 50 or other parts on which the slide is mounted, to take up or compensate for wear of the tool resulting from use. For this purpose the base plate 67 and elevated body portion 50a of the slide 50 are provided with complementary guide walls 88 disposed parallel to the guide-ways 49, so that the tool 14b may be moved longitudinally of the slide to the desired extent, due to wear or dressing of the tool, without adjustment of any of the remaining parts of the machine. The base plate 67 is adjusted by means of a screw 89 threaded into an opening forming in the base plate 67, the threads of the screw and its opening having proper pitch so that the plate may be adjusted the exact desired amount. The outer end of the screw 89 extends through and rotates in an opening formed in an up-standing plate or wall 90 fixed to the slide 50. The screw 89 is provided with spaced collars 91, 92, which engage the opposite sides of the wall 90 to prevent endwise movement of the screw.

Figs. 8 and 9 show a construction similar to that shown in Figs. 6 and 7 except that the tool supporting shaft 69 is driven by an electric motor 93 mounted within the casing 66, the armature shaft being connected directly to the shaft 69. The current for the motor 93 is supplied by leads 94 extending through an opening in the casing 66.

Fig. 10 shows a construction having a pedestal 95 arranged to support the tool 14c in a vertical plane to rotate on a horizontal axis. In this form of construction, the pedestal comprises the following: 96 indicates a spindle on the base plate 67. 97 indicates a bracket having at its lower end an integral sleeve or tubular member 98 rotatably and removably fitting the spindle 96, the sleeve being split, as shown at 98a, and having lugs through which bolts 99 extend to draw the split portions together.

The upper end of the bracket 97 is provided with a tubular member 100 into which is fitted a hollow member 101 having seats 102 at its opposite ends for anti-friction load and thrust bearings 102', which support a shaft 103. The hollow member 101 is held in the tubular member 100 by set screws 104. Oil is supplied to the bearings by a duct 105. The shaft 103 extends through the hollow member 101 and at one end it carries the grinding tool 14c and at its opposite end it is recessed to receive the shaft end 106 of the flexible shaft 107. The shaft 107 is provided with a fitting 108 on which slides and rotates a coupling 109 adapted to be threaded on the tubular end 110 of a cap 110' threaded into the adjacent end of the hollow member 101, the coupling 109 serving to clamp the collar 111 against the tubular end 110, to detachably hold the shafts 107 and 103 in connected relation. The end 106 and shaft 103, are suitably keyed together.

The shafts 78a and 107 are driven in any desired manner.

By loosening the bolts 99 the bracket 97 may be rotated about the axis of the spindle 96 to position the tool 14c in operative relation to the surface to be ground.

In one operating position of the pedestal 95, the shaft 103 is disposed at right angles to the direction of movement of the slide 50 and plate 67, especially when the tool 14c is to grind a convex surface, but the shaft 103 may be arranged in any other angular position when the surface to be ground is straight.

Fig. 11 is a diagrammatic view showing the operation of the tool 14a turning a plane surface on the work-piece A. Fig. 12 is a diagrammatic view showing the tool 14b grinding a concave surface and Figs. 13 and 14 show the tool 14b turning convex surfaces. Fig. 15 is a diagrammatic view showing the tool 14c grinding a plane surface and Fig. 16 is a similar view showing the tool 14c adjusted to a different position and grinding a convex surface.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In a machine of the class described, the combination with a support and tail and head stocks providing centers for a work-piece, of a frame disposed at right angles to the axis of said centers, a main slide on said frame, a rotatable support on said slide, a gear on the periphery of said rotatable support, a shaft on said frame, a gear splined on said shaft and meshing with said first mentioned gear, a base member on said rotatable support, a slide on said base member, a pedestal adjustably mounted on said last mentioned slide, a shaft mounted in said pedestal and carrying a tool, and means for rotating the last mentioned shaft.

2. In a machine of the class described, the combination with a support and tail and head stocks providing centers for a work-piece, of a frame disposed at right angles to the axis of said centers, a main slide on said frame, a rotatable support on said slide, a base member on said rotatable support, a slide adjustably and removably mounted on said base member, a pedestal on said last mentioned slide, said last mentioned slide having a length greater than the length of said base member and said pedestal being mounted on one end of said last mentioned slide, a shaft in said pedestal, and means for rotating said shaft.

3. In a machine of the class described, the combination with a support and tail and head stocks providing centers for a work-piece, of a frame disposed at right angles to the axis of said centers, a main slide on said frame, a rotatable support on said slide, means for rotating said support, a base member on said rotatable support, a slide on said base member, a separate slide on said last mentioned slide, a pedestal carrying a tool, mounted on said separate slide, means for adjusting said separate slide, and means for rotating the tool on said pedestal.

4. In a machine of the class described, the combination with a support and tail and head stocks providing centers for a work-piece, of a frame disposed at right angles to the axis of said centers, a main slide on said frame, a rotatable support on said slide, a base member on said rotatable support, a slide on said base member, a vertical spindle on said base member, a bracket adjustably mounted on said spindle and carrying a tool, means for rotating said tool, and means for rotating said rotatable support.

5. In a machine of the class described, the combination with a support and tail and head stocks providing centers for a work-piece, of a frame disposed at right angles to the axis of said centers, a main slide on said frame, a rotatable support on said slide, a base member on said rotatable support, a slide on said base member, a pedestal mounted on said last mentioned slide, a shaft mounted in said pedestal and carrying a tool, and a motor carried by said pedestal for driving said shaft.

6. In a machine of the class described, the combination of a support and tail and head stocks mounted thereon and providing centers for a work-piece, of a frame, a main slide thereon, a rotatable support on said slide, a slide on said rotatable support, and supporting means on said separate slide for a tool, said means including relatively adjustable elements for positioning the tool relative to the surfaces of the work-piece, a separate slide on said last mentioned slide, means for adjusting said separate slide, a pedestal on said separate slide, a shaft mounted in said pedestal and carrying a tool, and a motor carried by the pedestal for driving said shaft.

GROVER E. CLEVELAND.